Patented July 11, 1933

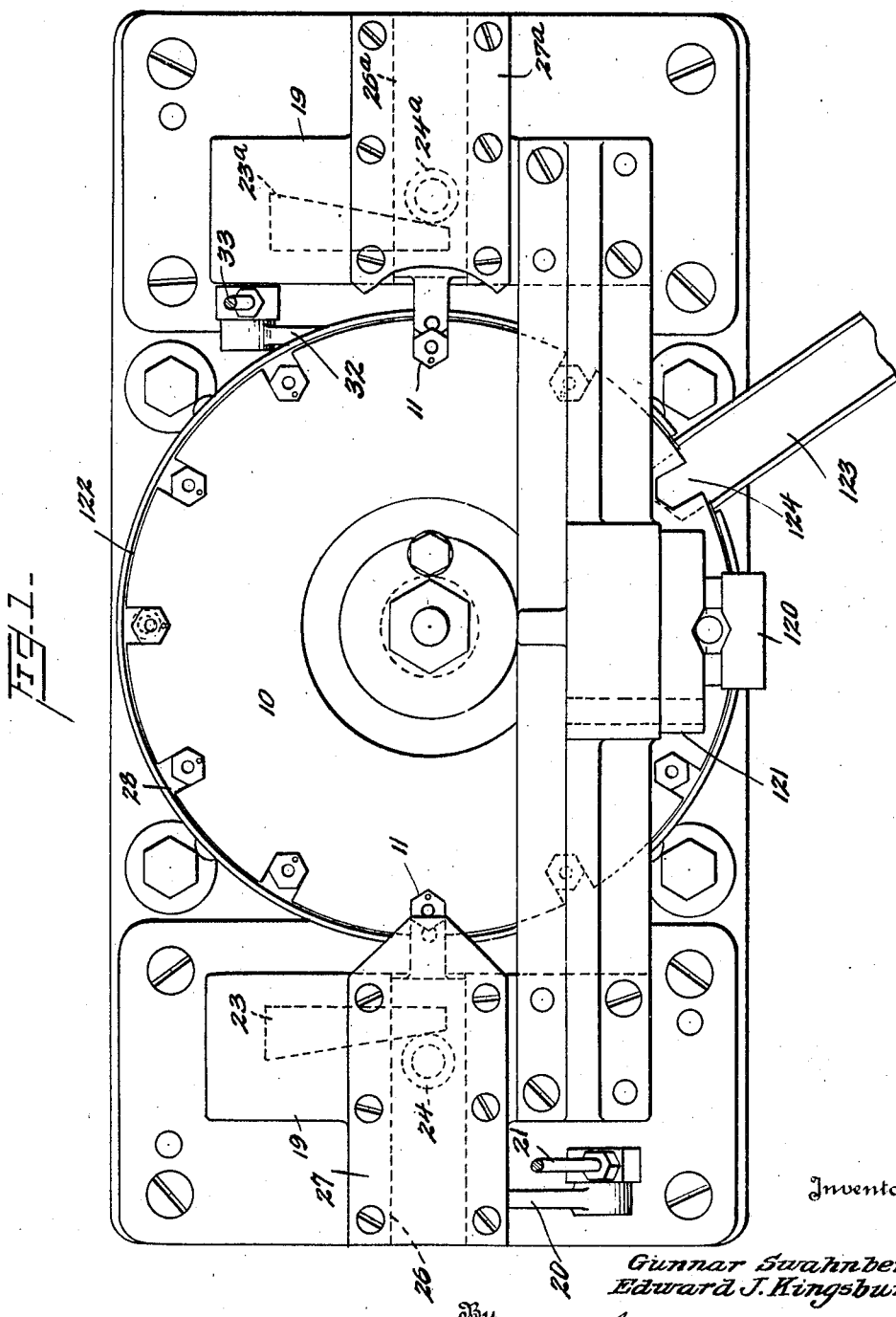

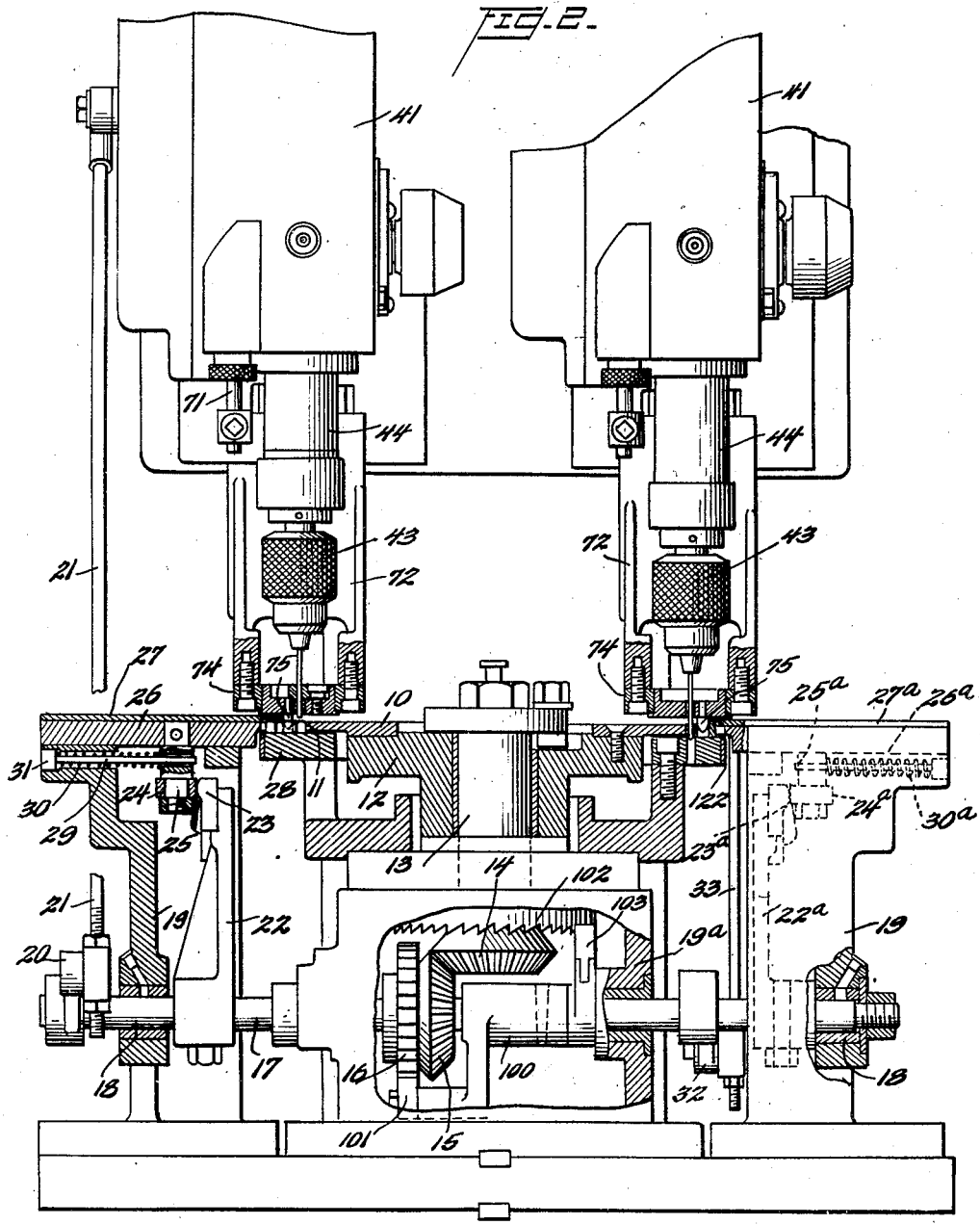

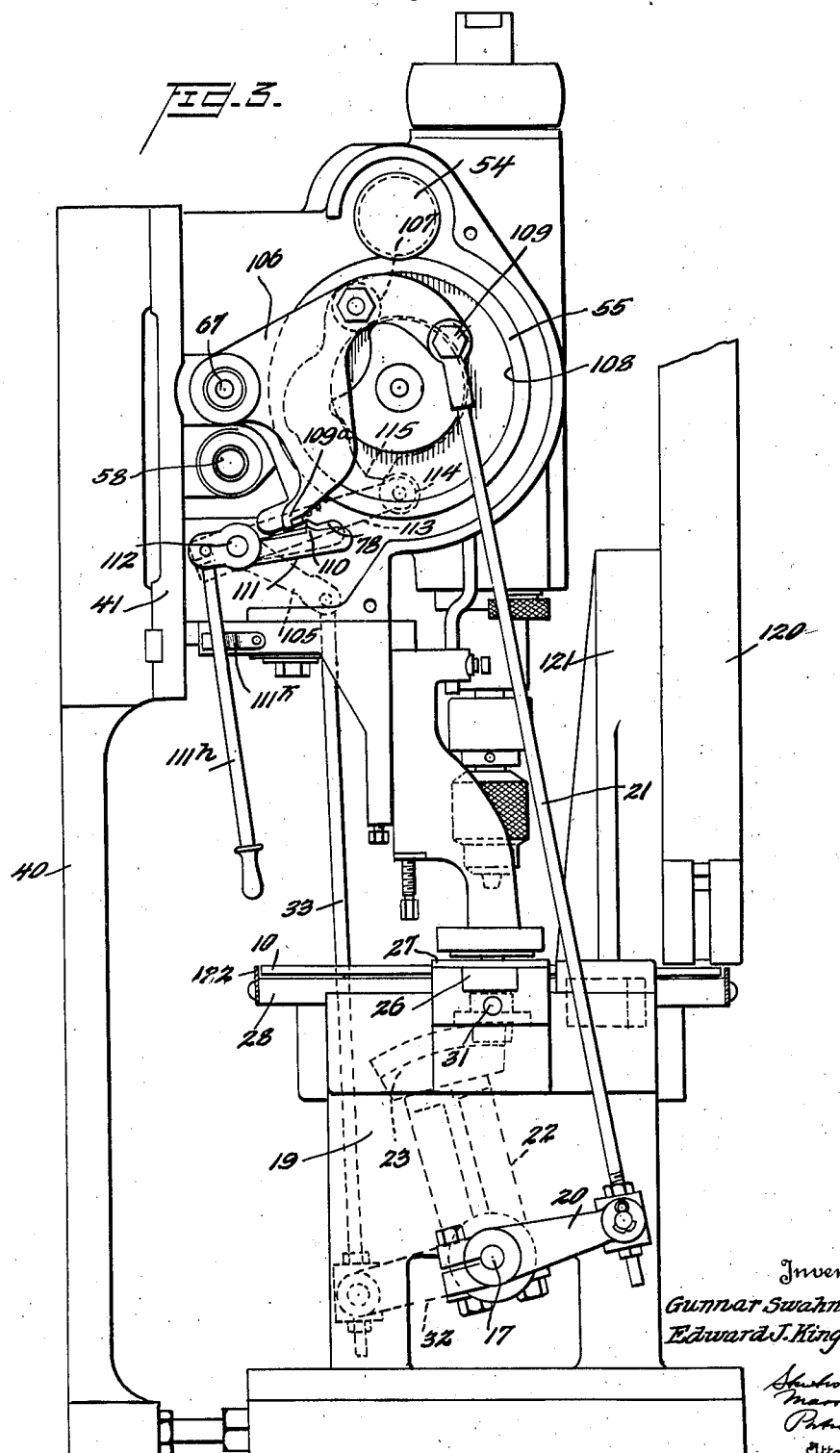

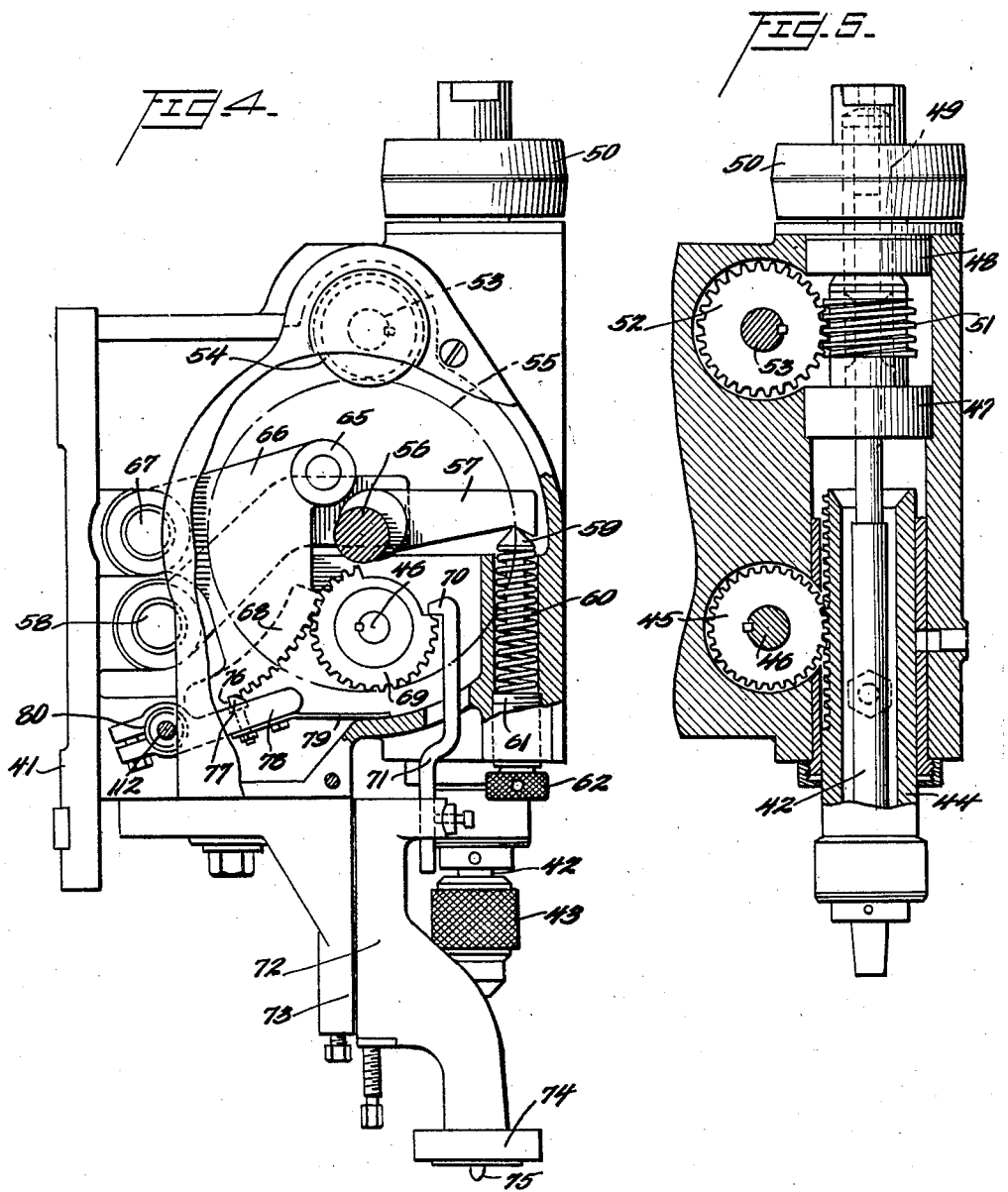

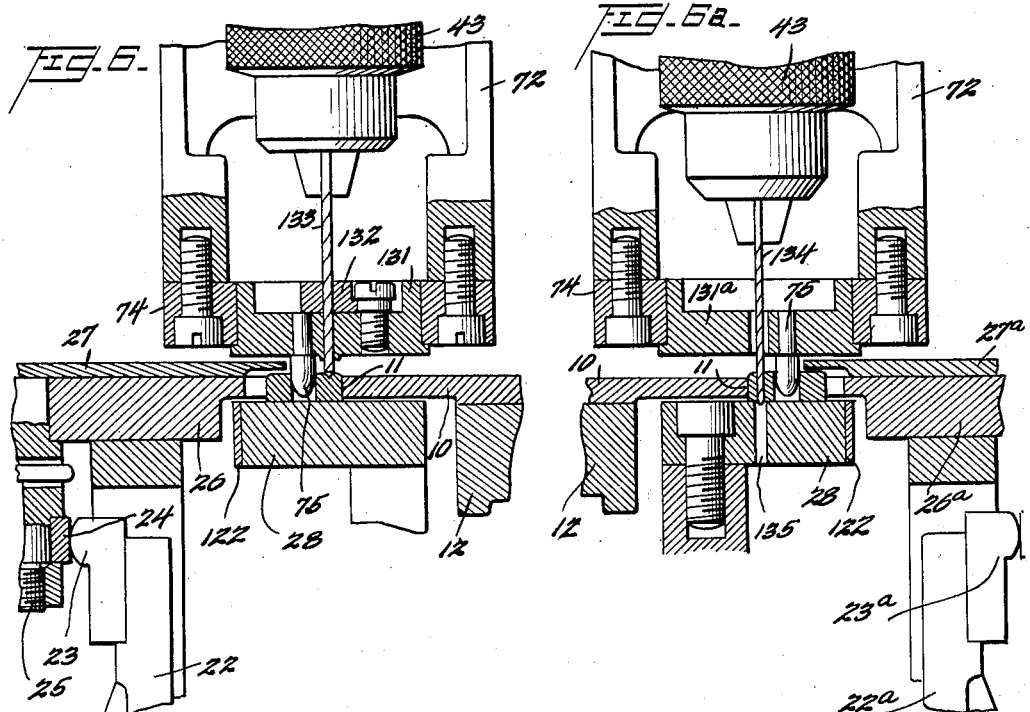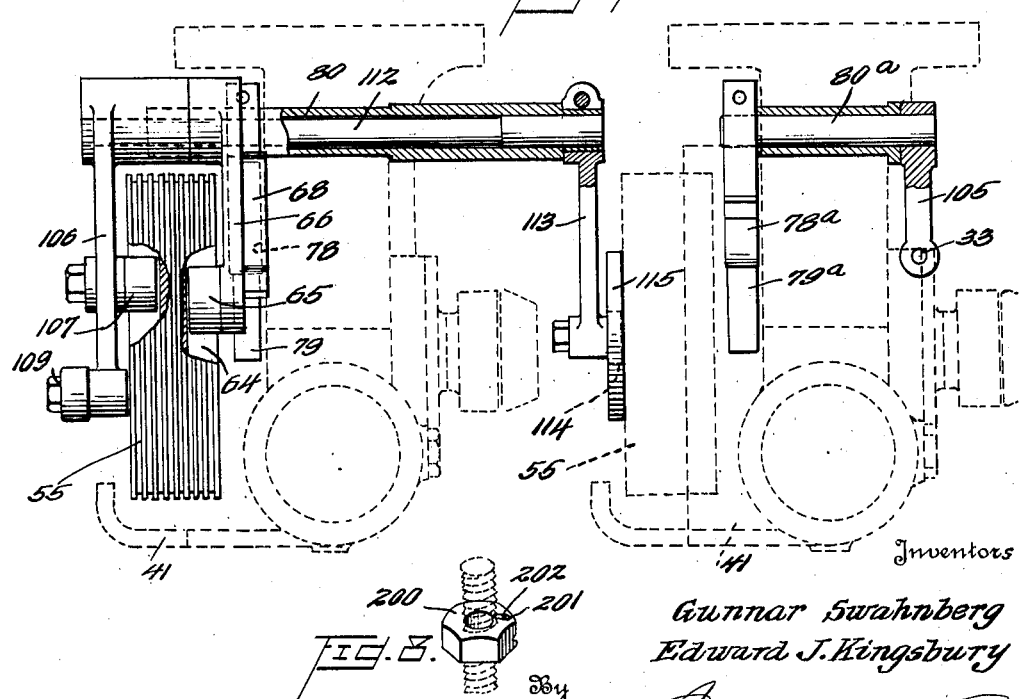

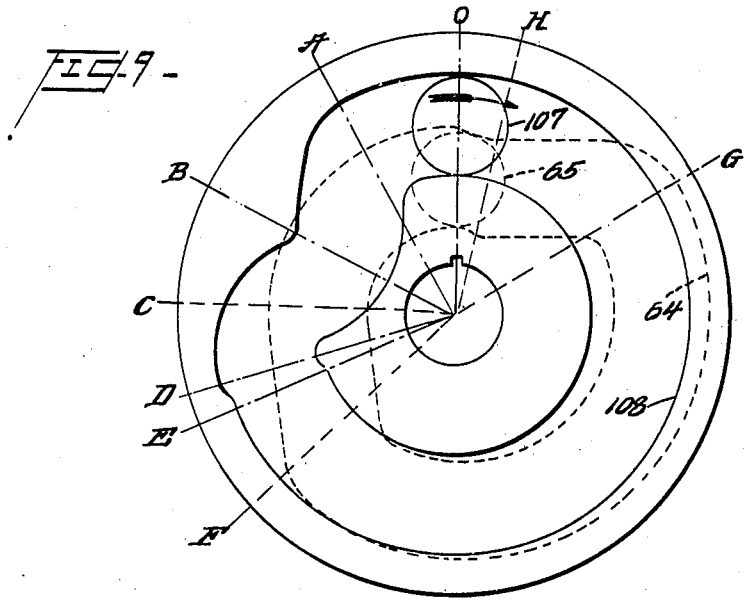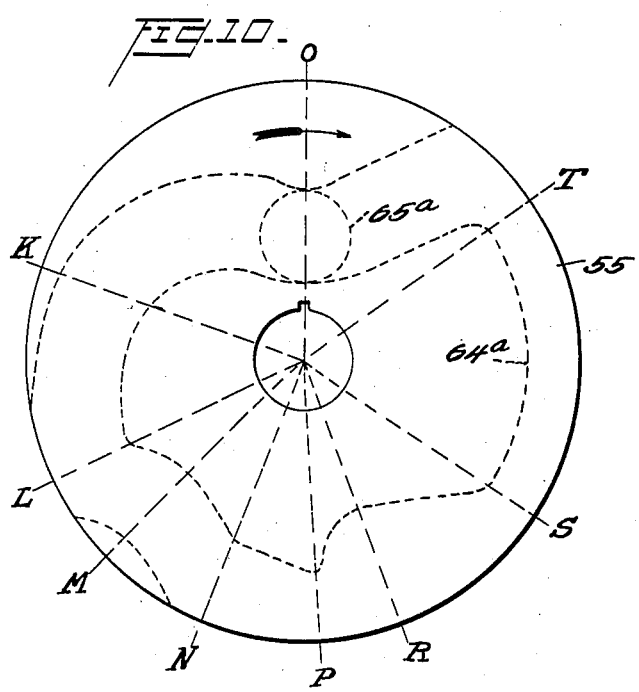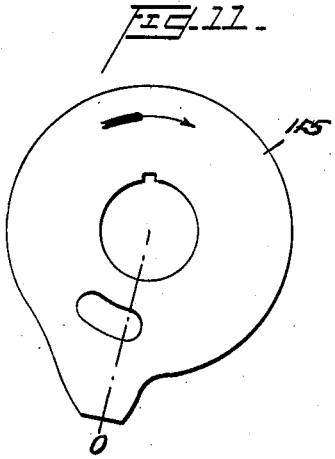

1,918,150

UNITED STATES PATENT OFFICE

GUNNAR SWAHNBERG AND EDWARD JOSLIN KINGSBURY, OF KEENE, NEW HAMPSHIRE, ASSIGNORS TO KINGSBURY MACHINE TOOL CORPORATION, OF KEENE, NEW HAMPSHIRE, A CORPORATION OF NEW HAMPSHIRE

MULTIPLE HEAD AUTOMATIC DRILLING MACHINE

Application filed September 11, 1931. Serial No. 562,370.

This invention relates to improvements in machines for automatically centering and working small articles which must be manufactured rapidly and in quantity, and which require unusual precaution as to the location of one part with respect to another.

According to this invention, a work holding turret is caused to move intermittently whereby it receives an article and successively presents it at working points, and then releases the article for automatic discharge. The working heads are connected to the turret by an interlocking system so that the work is brought to and clamped in a tentative working position, centering devices are moved to establish definite working position, the tools are caused to operate upon the article, and thereupon the tools and centering devices are retracted from the article, and indexing of the turret accomplished to bring the next article of work forward.

The invention resides in certain combinations of parts to accomplish these purposes, as will appear in the course of the following specification and claims.

An illustrative machine according to the invention is set forth on the accompanying drawings, the machine being intended for the automatic quantity production of lock nuts of the type having a small hole drilled at one corner and at a predetermined distance from the nut axis.

The drawings show:

Figure 1 is a plan view of the turret with clamping slides, the tool mechanism being removed for clearness.

Figure 2 is a vertical face view of a machine, with turret elements shown in vertical axial section, on a somewhat smaller scale.

Figure 3 is a corresponding side elevation.

Figure 4 is a side elevation, with parts broken away, of one working unit, showing the internal arrangement of the spindle and associated parts.

Figure 5 is a corresponding vertical sectional view substantially through the axis of the spindle.

Figures 6 and 6a are detailed views, on a large scale, showing the relationship of the turret plate, the clamping slides, and the tool in working positions, for the two heads shown in Figure 2.

Figure 7 is a top plan view showing the interlocking devices for connecting the two heads.

Figure 8 is a perspective view showing a nut of the type to be worked upon the machine illustrated.

Figure 9 is a diagram showing the cam tracks on the friction wheel of the master head.

Figure 10 is a similar view of the cam track on the friction wheel of the auxiliary head.

Figure 11 is a view of the restarting cam on the auxiliary head.

In these drawings the turret plate 10 has a plurality of notches 11 in its edge, twelve being illustrated on the drawings. The turret plate is secured to a turret body 12 mounted on a vertical spindle 13 having a mitre gear 14 on its lower end in mesh with a mitre gear 15 which is connected to a ratchet wheel 16 and therewith loosely mounted on the rock shaft 17 which extends beneath the turret plate 10 and is journaled in bushings 18 of the machine brackets 19. The rock shaft 17 carries a sleeve 100 pinned for rocking movement therewith, upon which is pivotally mounted a pawl 101 engaged with the ratchet wheel 16. The stationary housing structure 19a which likewise provides bearing supports for the rock shaft 17 is provided with a pawl 103 which engages with the retaining ratchet wheel 102 and prevents reverse movement thereof.

As shown in Figures 1 and 3, as the turret plate travels, each notch in its periphery is brought beneath a feeding chute 120, and thus receives the lowermost nut from this chute. The chute is carried by a bracket 121 extending across the front of the turret. The nut thus received is engaged loosely at its edges and is carried around with the turret plate inside of the peripheral flange or collar 122 to the various operating stations, at which points the collar is cut away to permit the passage of the projecting end 26, 26a of the horizontal clamping plate described above. As any notch 11 of the turret plate 10 passes from the last working position, it ultimately comes over a discharge chute 123 and over a notch 124 cut in the fixed bed plate 28 at this point, so that the finished nut may slip down onto the chute 123 and be discharged from the machine.

The left hand end of the rock shaft 17 in Figure 2 is rigidly connected with a rock arm 20 having a connecting link 21 leading to the operating head of one work unit and being operated from time to time as will be described in detail hereinafter. This end of the shaft 17 also supports a cam piece 22 having a helical cam surface 23 at its upper end adapted to engage the roller 24 carried by a stud 25 projecting downwardly from a slide body 26 mounted for horizontal reciprocation in the upper end of one frame bracket 19, and provided with a cover plate 27 which rests lightly against the upper edge of the turret plate 10 and thus prevents rocking movement of this plate about a horizontal axis. The slide body 26 has a V-shaped notch at its inner end. The turret plate 10 further is carried in rotation about a fixed annular table 28 of the frame work. The stud 25 has an opening therethrough in a radial direction with respect to the axis of spindle 13 and turret plate 10 to receive a spring guide rod 29 passing through the coil spring 30 which acts against the plug 31 at the outer end of the rod 29 and against the stud bolt 25 whereby to force the horizontal slide 26 inwardly toward the turret plate.

A similar arrangement including the cam rocker 22a with helical cam head 23a cooperates with the roller 24a and stud bolt 25a and spring 30a of the horizontal slide member 26a for the other head, a cover plate 27a being likewise provided along with the other parts so that similar structures are present at the two working positions illustrated.

The right hand end of the shaft 17 also supports a rock arm 32 connected to a link 33 which engages with elements of the second head in the manner which will be more fully described hereinafter.

Each of the working units or heads is secured to upstanding members 40 (Figure 3) at the rear of the machine by means of the bases 41. The internal arrangements, except for the interlocking system of the two units, may be identical, and hence only one need be described. One of these units, however, will be designated as the "master" unit or head inasmuch as it initiates the movement of the rock shaft 17, while the other head in the present illustrative example of the employment of two heads will be referred to as the "auxiliary" head since its operation is initiated from the rock shaft 17.

In Figures 4 and 5, the drill spindle 42 is illustrated as having the drill chuck 43 of normal type and as extending upwardly through a quill 44 having rack teeth thereon engaging with the teeth of a gear 45 mounted on a shaft 46. The upper end of the spindle 42 passes through bearing members 47, 48 and through a sleeve 49 having a drive pulley 50 mounted thereon. The sleeve 49 and spindle 42 have inter-engaging keys or similar devices whereby the rotation of the pulley 50 causes a rotational movement of the spindle 42 in known manner. The sleeve 49 is also connected with a worm 51 for driving a worm gear 52 on a shaft 53. As shown in Figure 4 the shaft 53 also carries a friction wheel 54 in engagement with the periphery of a friction wheel 55 which is mounted by its shaft 56 on an arm 57 having a pivot connection 58 to the unit frame, and bearing at its outer end against the nose 59 of a plunger having a coil spring 60 forcing the same upwardly as regulated by the threaded plug 61 which is adjustable from the exterior by the knob 62 to regulate the friction between the wheels 54 and 55.

The friction wheel 55 of the master head (Figure 9) has a cam track 64 therein for the roller 65 carried by the rock arm 66 having a pivot mounting 67 in the unit frame. The rocker 66 has a toothed segment 68 in engagement with the mutilated gear 69 keyed to shaft 46. The mutilated portion of the gear 69 receives the hook 70 of the lift rod 71 connected to the vertical slide 72 which travels on a guide bracket 73 connected to the bottom of the unit. The lower end of the vertical slide 72 has a head 74 with a guide pin 75 therein for establishing the true working position of the nut, as will be described hereinafter. A rocker 66 is retained against counter-clockwise movement by the cooperation of its end 76 with the pin 77 or latch arm 78 which is held normally raised by the spring 79, and is secured to the hollow shaft 80.

The friction wheel 55 of the auxiliary head (Fig. 10) has a cam track 64a thereon for the roller 65a of this head. The latch arm 78a for the auxiliary unit is mounted on the shaft 80a thereof, and is normally held in engagement with its corresponding rocker by the spring 79a. The lever arm 106 also has a hooked end 109a which may be engaged at the completion of a clockwise movement of the lever 106 by a lug 110 on a latch arm 111 fixed on the shaft 112 which extends through the hollow shaft 80 of this master head, and carries at its other end an arm 113 (Figure 7) fixed thereto and supporting a roller 114 which is engaged with a cam 115 carried by the friction wheel 55 of the auxiliary head.

The lower end of the vertical slide 72 has the clamp 74 thereon to receive a bushing member 131 which supports the centering pin 75 and also is provided with a drill bushing 132 which has a hole in alinement with the corresponding hole in the member 131, so that the spotting drill 133 is guided very close to its operating point, and thus the spotting drill 133 is supported and prevented from radial or peripheral movement with respect to the nut, and the spotting hole may be cut even on an inclined surface of the nut. Since very few chips are moved in the spotting operation, the space between the nut and member 131 is not obstructed thereby.

In the head for the auxiliary unit, the horizontal slide 26a likewise has a V-shaped notch for engaging the same faces of the nut as were engaged by the notch in the clamping member 26, while the centering pin 75 is of the same size and location relative to its drill as was occupied by the centering pin 75 in respect to drill 133. Hence the nut is brought into the same relative position to the second drill as it occupied with respect to drill 133. Likewise the clamping member 74 at the bottom of the vertical slide 72 is provided with a member 131a to support the centering pin 75 for this unit, but the apertures through which the finishing drill 134 operates may be larger, as the spotting drill 133 has prepared a definite point for the drill, and there is no tendency for this drill to wander on the upper surface of the nut. Therefore, also, a greater space may be provided between the member 131a and the upper surface of the nut, to afford free clearance for the chips which are formed in this operation. The finishing drill 134 passes downwardly through the nut and is received in the hole 135 in the fixed table 28.

As an example of the work which is done on such a machine, the nut 200 of Figure 8 is to have a hole 201 drilled therein at one corner parallel to the axis, to receive the spring wire 202. This wire is fixedly secured as by hammering the nut, so that its arm extends chordally across the nut and engages in the thread of the corresponding bolt to lock the nut against accidental unscrewing.

In Figure 9, the cam tracks for the master head friction wheel 55 are shown to have successive radial distances from the axis of rotation of this friction wheel, generally as follows: The cam track 64 for controlling the drill cam has a dwell from the initial position of substantially 90° to point C, after which it has a rise for producing the downward feeding of the drill and work clamp slide to position F, and then a slow rise for the actual feeding of the drill to the work from F to G, with a subsequent return to point H at which the drill clamp slide and the drill have been fully removed from the work, followed by a slight rise of about 13° in the illustration. At H, the corresponding rocker 68 has been moved downward until its locking point 76 is beyond the locking lug 77 of latch 78, and this rise (H to O) permits the latch to engage and hold the rack 68. During this cycle, the cam track 108 for operating the turret has had a short dwell from O to A, followed by a portion (A to B) for retracting the rock shaft followed by a portion (B to D) during which the rock shaft is moved for actual indexing. Thereafter, there is a slight return (D to E) to permit relief of pressure on the clamp slides, and also to slightly raise the link 33 to free the auxiliary latch shaft 80a so that the latch 78a may later engage properly. From E to O, the cam track 108 is substantially circular so that the parts remain in the actuated position. It will be noted that the indexing is occurring (C to D) while drill clamp slide is being actually lowered.

In the diagram of Figure 10 showing the auxiliary friction wheel and its cam track, from O to K the auxiliary drill clamp slide is being lowered and the drill moved toward operating position. From K to L, the drill is engaging the work. From L to M, the drill is retracted to withdraw chips from the hole, and then is returned from M to N. A further drilling operation then occurs from N to P, followed by a second retraction for clearing the chips and return (P to R to S) followed by the final drilling from S to T until the drill breaks through the hole. From T to O the drill and the drill clamp slide are retracted from engagement with the work so that indexing may occur.

The cam 115 shown in Figure 11 is for the purpose of operating the roller 114 for unlocking the master head after completion of the work by the auxiliary head. Since the roller 114 is mounted below the cam 115, the point O on cam 115 corresponds to the initial position O in Figure 10.

In operation, each of the heads may be driven by independent devices and at different speeds, since their operation is controlled by the interlock instead of by a synchronous movement.

Referring to the operation of each unit head, it may be pointed out that as the pulley 50 is driven, the spindle 42 is rotated and therewith a drill carried by the chuck 43 is turned. If the unit is at all times free to move, the worm 51 will drive the work wheel 52 and shaft 53, and the friction wheels 54, 55 will cause the cam track 64 to move and thus the rocker 66 will be moved at first upwardly or in a counter-clockwise direction about its pivot 67, and the toothed sector 68 engages and turns the mutilated gear 69. The hook end 70 is released and permits the vertical slide 72 to move downwardly as under pressure of a spring (not shown) until the centering pin 75 engages and centers the nut. At the same time, but at a somewhat lesser rate, the gear 45 on shaft 46 moves the quill 44 and thus feeds the drill chuck 43 to the work. The distance of this feeding is regulated by the adjustment of the initial position of the chuck, and by the conformation of the cam track 64 or 64a.

Initially, it may be assumed that the cams are in the "O" positions of Figures 9, 10 and 11 with regard to their respective rollers, and that the left hand or master head in Figures 2 and 7 has been at a standstill, being retained by the engagement of its roller 65 in the cam track 64 so that movement of the friction wheel 55 is blocked while the rocker 66 thereof is held by latch 78, but has just been released by the roller 114 which has just been moved to its outward position by the hump at O on the cam 115 of the auxiliary unit, which likewise is in its initial position and held therein by the blocking engagement of its roller 65a in the cam track 64a of its friction wheel 55, through the latch 78a. The rocker 106 is, however, still held in its extreme clockwise position of movement by the manual latch arm 111. If the latch 111 of the master unit is now released manually as by the handle 111h (being then held by detent 111k), the rotation of the master friction wheel 55 can occur so that the cam track 64 will momentarily hold the roller 65 and therewith the rocker 66 in fixed position (Figure 9) from O to C. At the same time (O to A), the cam track 108 momentarily holds the roller 107 and rocker 106 in fixed position, and then causes (A to B) the clockwise movement of rocker 106 from the position shown in Figure 3. The link 21 is moved downward and the rock shaft 17 is given a clockwise movement (Figure 3) during which the pawl 101 moves freely over the ratchet wheel 16 and therewith the mitre gears 15, 14, and the spindle 13 are held by pawl 103. The cams 23, 23a retract the clamp slides 26, 26a so that the turret is free to turn. At this time no drilling head has moved downwardly. The cam track 108 (B to D) then returns roller 107 and rocker 106, and raises the rod 21 again so that the rock shaft is returned and pawl 101 now operates the ratchet wheel 16, and therewith the mitre gears 15, 14 and the spindle 13 by an angular distance equal to the spacing of the notches 11, thus producing the indexing. A new notch is thus brought forward beneath each of the heads. The counter-clockwise movement of shaft 17 in Figure 3 has also moved the helical cam surfaces of the heads 23, 23a (Figure 1) into the position shown, permitting the radially inward movement of the rollers 24, 24a and the slide plates 26, 26a until the V-shaped inner ends of these plates rest against the periphery of the turret plate 10 while the plate continues to turn. Ultimately, as the notch 11 comes into position the slide plates 26, 26a are moved by their springs into the corresponding notches whereby to prevent forward movement of the turret 10 and of the nuts in the notches thereof. Meanwhile, at C (Figure 9) the cam track 64 has begun the feeding of the master drill and drill clamp slide to the work, so that at this time the centering pin 75 thereof enters the hole of the nut and cooperates with the clamping slide 26 to accurately center and determine the angular position of the nut located beneath the master drill.

At the end of the counter-clockwise rocking movement of the shaft 17 (point D, Figure 9), its crank arm 32 pulls downward on link 33 whereby arm 105 is rocked, and therewith shaft 80a, so that the latch 78a of the auxiliary head is tripped and its rocker 66 is permitted to begin the counter-clockwise movement as determined by its cam track 64a (Figure 10) so that the centering pin 75 in the auxiliary head may take part in the positioning of the nut.

During the initial movement of the friction wheels 55 of the master and auxiliary units, as these are successively released, the slides 72 move downward and the centering pins 75 engage and move the work as required to establish it in proper position, possibly forcing the slide plates 26 and 26a backward against the action of their springs 30, 30a (C to F in Fig. 9: O to K in Fig. 10). The nut is thus seated accurately by the cooperation of the two faces of the V-groove in each of the slide plates 26, 26a and by the corresponding centering pin 75. By construction, these pins 75 are definitely located at the same radial distance from the turret axis, and hence the nuts are definitely clamped so that their axes are at the same distance from the turret axis and so that one edge of the nut is located by the V surfaces. It will be noted that these surfaces engage with the nut surfaces diametrically opposite the point to be drilled, so that ample clearance and space is afforded for the drill bushing and for the drill itself.

With the continued movement of the friction wheels 55, 55a of each unit (F to G in Fig. 9: K to T in Fig. 10), the nut is spotted or drilled accordingly as it is beneath the master unit or the auxiliary unit. As each unit completes its work, its friction wheel 55, 55a continues to turn. During the continued movement of the friction wheel 55 of the master unit, the rocker 66 is brought back to its original position, whereupon it is latched by the member 78. Meanwhile, the auxiliary unit may be continuing to operate, since it has a longer task to perform in drilling through the entire depth of the nut.

Ultimately, when the auxiliary unit finishes its downward stroke and the cam track 64a thereof begins to lower the corresponding roller 65, the rocker 66 is moved backward until it engages with its latch 78a which has been restored to its latching position by the return of rock shaft 17.

It will be understood that by moving the latch 111 of the master unit into a clockwise or disengaged position and securing it there, the device becomes fully automatic, and in succession the turret is rotated while nuts are being fed to and discharged from, the nuts are centered and held, the spotting and drilling operations are performed, and re-indexing of the turret occurs, etc. If the manual control 111h is moved to release mechanisms as described above, and then returned, a single manufacturing operation will be accomplished; and that the manual control is brought into engaging position at any time, the mechanisms will complete the cycle on which they are then engaged, and then come to a standstill in the initial position as above referred to.

As the drills 133, 134 and centering pins 75 are withdrawn upwardly during the course of operation of the working heads, the cover plates 22, 22a operate as strippers to prevent the upward movement of the nut out of its notch in the turret plate 10. The centering pins 75 are withdrawn after the drills are disengaged, as the hooks 70 are not reengaged by mutilated gears 69 until the gears 45 have withdrawn the quills sufficiently to clear the drills. Hence no movement of the nut can occur, and no breakage of the drills.

It is preferred to form the V-shaped notches in the clamping members 26, 26a with cavities at their bottom, to prevent false positioning of the nuts by accumulation of chips at this point.

The spotting drill 133 is considerably larger than the finished hole is to be, so that the drill likewise serves to provide a countersink around the hole when completed, as a guide for the lock-nut wire which is later to be inserted.

It is obvious that minor changes in the details of construction and arrangement of parts may be made without departing from the spirit of the invention, as set forth in the appended claims.

Having thus described the invention, what is claimed as new and desired to be secured by Letters Patent, is:—

1. A machine for drilling holes in convex end nuts parallel to the axis of the nut and extending through and at an angle to the convex surface of the nut, comprising a pair of drilling units each including a drill spindle having a drill and automatic means to feed and withdraw said spindle and drill, a work-holding turret having notches which each may receive a nut, plates each associated with a corresponding unit to engage a nut in a corresponding one of said notches whereby to hold the same against rotational movement about its axis, a work clamping device on each unit having a centering pin for entering the hole of the nut whereby to hold the nut against translational movement of its axis and to hold said nut axis at a predetermined distance from the axis of said drill, the drill of one of said units being adapted for spotting the nut and the drill of the other of said units for the finish-drilling operation, means actuated from said first unit for moving said plates simultaneously out of said notches, interlocking means connecting said units so that said actuating means is not operated until both said units have made feeding and withdrawal movements, and means operated with said plate moving means for advancing said turret after said plates have been withdrawn from said notches.

2. In a drilling machine, master and auxiliary drilling units each including a drill spindle having a drill and automatic means to feed and withdraw said spindle and drill, individual latches to hold said units against drilling movement, said units upon release of their latches making independent feeding and withdrawal movements, a rotatable work-holding turret having notches therein, slide plates and means to move the same into said notches when said notches are presented by said turret opposite said plates, a rock shaft, means on said master unit to rock said shaft when said master unit is free for movement, means on said shaft to advance said turret notch by notch, means on said shaft to move said plates from said notches prior to the advancement of said turret and to release said plates before the end of said advancement so that they may enter the notches as the turret moves into a new working position, means on said shaft for releasing the latch of said auxiliary unit, and a device on said auxiliary unit to release the latch of said master unit when the auxiliary unit has completed its working position.

3. In a drilling machine, master and auxiliary drilling units each including a drill spindle having a drill and automatic means to feed and withdraw said spindle and drill, individual latches to hold said units against drilling movement, a rotatable work-holding turret having notches therein, slide plates and means to move the same into said notches when said notches are presented by said turret opposite said plates, a rock shaft, means on said master unit for rocking said shaft when said master unit is free for movement, means on said shaft for advancing said turret notch by notch, means on said shaft for removing said plates from said notches prior to the advancement of said turret and to release said plates before the end of said advancement so that they may enter the notches as the turret moves into a new working position, and means on said auxiliary unit for preventing movement of said turret until the auxiliary unit has completed its working position.

4. In a device of the class described, master and auxiliary working heads including master and auxiliary tools, independent driving means for said heads, independent latching means for bringing each of said heads to a standstill in an initial position, a rock shaft, said master head including two cams, one of said master head cams operating to feed the tool to the work and means operated by the other said master head cam for moving said rock shaft, a work holding turret, means operated by said rock shaft for advancing said turret and thereafter releasing the latching means of said auxiliary head, said auxiliary head including two cams of which one operates to feed the tool, and means operated by said other cam of the auxiliary head to release the latching means of said master head.

5. A device as in claim 4, in which a work centering means is provided on each head, and is operated by said tool feeding cam thereof, and a clamp slide is provided for the turret, means operated by the rock shaft to withdraw said clamp slide, and to permit it to reengage the turret for locking the same the cams on said master head being synchronized so that the centering means is brought into engagement with the work substantially simultaneously with the locking movement of said slide plate.

In testimony whereof we affix our signatures.

GUNNAR SWAHNBERG.
EDWARD J. KINGSBURY.